Figure 1:
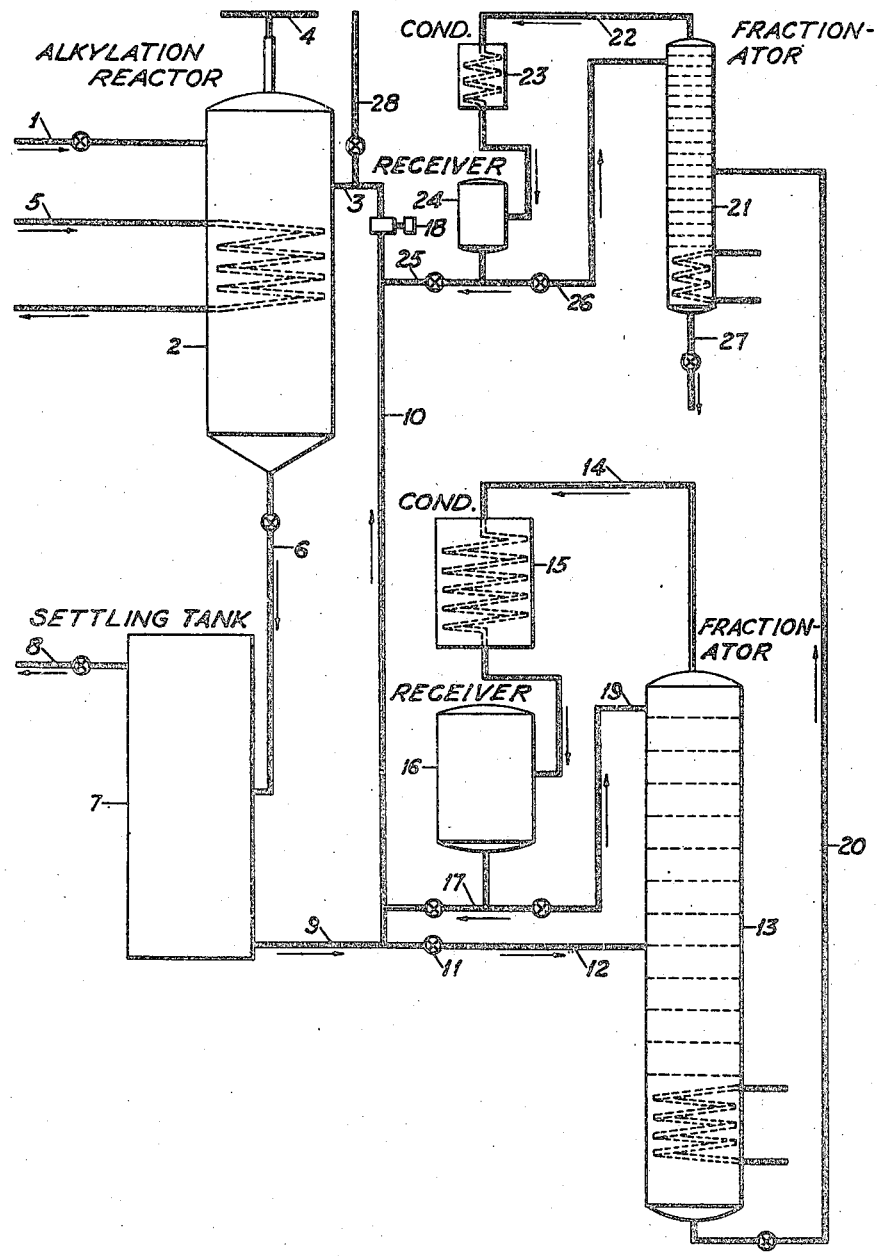

Feb. 24, 1948.                C. S. KUHN, JR                    2,436,695
                            ALKYLATION PROCESS
                           Filed July 18, 1942              2 Sheets–Sheet 2

CARL S. KUHN, JR.
INVENTOR

BY Sidney A. Johnson
ATTORNEY

Patented Feb. 24, 1948

2,436,695

UNITED STATES PATENT OFFICE 2,436,695

ALKYLATION PROCESS

Carl S. Kuhn, Jr., Dallas, Tex., assignor to Socony-Vacuum Oil Company, Incorporated, New York, N. Y., a corporation of New York Application July 18, 1942, Serial No. 451,383

4 Claims. (Cl. 260—683.4)

1

This invention relates to the alkylation of paraffinic hydrocarbons, including cycloparaffinic hydrocarbons, with olefinic hydrocarbons in the presence of catalysts. More particularly, this invention relates to such a catalytic alkylation process in which hydrogen fluoride is the effective catalytic agent.

Processes for the formation of higher molecular weight hydrocarbons from paraffinic hydrocarbons having a tertiary carbon atom by reaction with olefinic hydrocarbons are well known. Grosse and Linn, in U. S. Patent 2,267,730, have disclosed that hydrogen fluoride possesses many advantages as the catalytic agent for carrying out such a process. According to the disclosure of Grosse and Linn, organic fluorides are formed in the course of the alkylation reaction. The hydrogen fluoride values are recovered for reuse by the formation of double fluorides of calcium or aluminum, which, in turn, decompose to yield olefins and hydrogen fluoride.

It has been disclosed by Holm, Oakley and Humphreys in U. S. Patent 2,224,102 that, in order to get efficient alkylation using sulphuric acid as the catalyst, the amount of organic by-products formed as a result of reactions between the olefins and the sulphuric acid, or formed through interaction of the olefins in the presence of sulphuric acid, should be kept below 2% by weight, and preferably below 1% by weight of the acid catalyst. Should the alkylation progress at temperatures above 40° F., the lower limit is stated to be the maximum for efficient alkylation. As pointed out by Holm et al., the concentration of the organic by-products in the alkylation zone may be controlled by, (a) the introduction of fresh acid, (b) by controlling the charge feed rate, which controls the ratio of olefin to acid catalyst, (c) by controlling the degree of contacting or mixing of the materials being reacted, and (d) by controlling the ratio of isoparaffin to olefin. Once a given set of alkylation conditions have been decided upon, however, only factor (a) is under control of the operator. The other three factors may be adjusted to give minimum by-product formation consistent with the alkylation reaction rate desired, the equipment, and the economical operation of the alkylation reaction. After these factors have been fixed, the rate of organic by-product formation is fixed, and the only way to control the concentration thereof in the catalyst is by the constant addition of fresh acid. Obviously, where there is appreciable by-product formation, large quantities of fresh acid will be required to maintain a by-product concentration of less than 1%.

The rate of by-product formation under optimum conditions is usually between about 0.50 to 2.50 per cent by weight of the olefin charged. When using the hydrofluoric acid catalyst it can

2 be easily measured by withdrawing the samples of spent acid from the alkylation zone after definite time intervals and determining the concentration of organic by-products in these samples by analytical batch distillation.

Hydrogen fluoride is relatively expensive, and in an impure state has little, if any, commercial value beyond its potential hydrogen fluoride content. It is essential, therefore, to the operation of an alkylation process using hydrogen fluoride as the catalyst that it be returned to the process in a condition in which its catalytic activity is substantially unimpaired. Losses of hydrogen fluoride which must be compensated for by make-up must be kept to a minimum compatible with economical recovery.

It is the object of this invention to provide a simple and economical process for the regeneration of the hydrogen fluoride catalyst used in the alkylation reaction.

It is a further object of this invention to improve the overall efficiency of a hydrogen fluoride alkylation process to such an extent as will enable it to compete with alkylation processes effected by other catalytic agents such as aluminum chloride, sulphuric acid and the like.

Other and further objects of this invention will become apparent from the description thereof and from the appended claims.

I have discovered that in the case of hydrogen fluoride as the alkylation catalyst, the amount of these organic by-products formed by side reactions may rise as high as 8% without appreciably affecting the efficiency of the catalyst as measured by determining the weight per cent yield of alkylate based on the weight of olefin used in the alkylation.

I have further discovered that hydrogen fluoride may be separated from the organic by-products by fractional distillation. It is my belief, although my invention is not to be considered as limited to any theoretical consideration, that the major portion of the hydrogen fluoride in the used catalyst remains as such under optimum conditions of alkylation, but is contaminated with dissolved organic by-products, principally olefin polymers and complex organic fluorides, formed during the reaction. This major portion of the hydrogen fluoride may be recovered in a form suitable for reuse by fractional distillation from the organic by-products. This distillation may be accomplished by heating the mixture to a temperature not exceeding 50° C. to 100° C. Substantially pure hydrogen fluoride vapor is recovered. The remaining portion of the hydrogen fluoride, which is probably actually chemically combined with the organic by-products, as organic fluorides, may be decomposed to yield its hydrogen fluoride content by distilling at a higher temperature, somewhat above 150° C. As in the previous distillation, substantially pure hydrogen fluoride vapor is removed overhead for subsequent condensation and reuse. A portion of the condensed hydrogen fluoride may be returned to the still in each distillation step as reflux. Obviously the distillation and recovery of hydrogen fluoride may be done in a single step, but a two step process is preferable since most of the hydrogen fluoride may be recovered at a lower temperature with better control and with less heat consumption.

Where the distillation of the impure catalyst is done in two steps, the bottoms from the first stage have a hydrogen fluoride content ranging from a maximum of about 45% by weight at 50° C. to about 12% by weight at 100° C. The organic residues, which form the bottoms from the second distillation contain a maximum of 0.07% by weight of fluorine calculated as hydrogen fluoride, and may be considered as practically freed from fluorine compounds.

Generally the procedure followed in carrying out the process of this invention comprises the alkylation of the tertiary C-atom containing, paraffinic hydrocarbon with an olefin in the presence of hydrogen fluoride. The mixture is then allowed to settle into layers, and the upper layer consisting of the product and unreacted hydrocarbons is drawn off. The lower layer consisting of used catalyst is drawn off for reuse after removal of sufficient of the contaminating organic by-products so that its activity is restored to the proper level. To purify or regenerate the catalyst, a sufficient portion of the total catalyst is fractionally distilled, preferably in two stages, so that upon combining regenerated catalyst with untreated spent catalyst, the amount of contaminating organic by-products in the total is not over about 8%. Obviously the amount of by-product in the catalyst being returned to the alkylation reaction is kept somewhat under 8%, since further organic by-products are formed in the alkylation, and the average content of the catalyst in the reactor should not exceed 8% by weight of organic contaminants. The actual permissible value of the organic by-products in the catalyst returned to the reactor can not be arbitrarily given since it depends upon the rate of recirculation of catalyst to total weight of catalyst used in the reactor, and the amount of organic by-product formed in the alkylation reaction.

My invention may be better understood by a study of the accompanying drawings and the specific examples illustrating the operation thereof.

Referring to Figure 1, which is a diagrammatic illustration of an apparatus suitable for carrying out my process, a mixture of isoparaffin charging stock and olefin is introduced through line 1 to the alkylation reactor 2. In the reactor these hydrocarbons are mixed thoroughly with the hydrofluoric acid catalyst, entering through line 3 by means of agitator 4. A cold fluid is circulated through heat exchanger 5 to remove the heat of reaction and thereby maintain a suitable alkylating temperature in the reaction zone. An emulsion consisting of unreacted hydrocarbons, alkylate and acid leaves the reactor 2 through line 6 and flows to the settling tank 7. In the settling tank 7, two liquid phases separate; the upper phase, being the hydrocarbon phase, and the lower phase, the hydrofluoric acid having dissolved therein the organic by-products. The hydrocarbon phase is removed from the settling tank 7 through line 8 and passes to a fractionator (not shown) where the alkylate product is recovered from the unreacted hydrocarbons. These unreacted hydrocarbons (excess isoparaffins) are recycled back to the alkylation zone along with fresh feed. The acid phase is drawn off through line 9. The major portion of this acid catalyst is recycled directly back to reactor 2 through lines 10 and 3, but a portion, controllable by means of valve 11, is continuously removed through line 12 and flows to low temperature still 13. In still 13, over 90% of the hydrofluoric acid is distilled off from the organic by-products at a temperature not exceeding 100° C. Substantially pure hydrofluoric acid vapor is taken off as the distillate through line 14 and is liquefied in condenser 15, from whence it passes to receiver 16. The bulk of this pure acid is returned to reactor 2 through line 17 by means of a circulating pump 18. A portion of the acid may be returned to the top of the still as reflux through line 19. A mixture of hydrofluoric acid and organic by-products leaves the bottom of still 13 through line 20 and enters still 21. This still is operated at higher temperatures, above 150° C., and in it substantially all of the rest of the hydrofluoric acid, including that chemically combined, is distilled off as vapor through line 22. This hydrofluoric acid vapor is condensed in condenser 23 and liquid hydrofluoric acid passes to receiver 24. As with the first still, the major portion of the acid is returned to reactor 2 through line 25 by means of the circulating pump 18. A portion of liquid hydrofluoric acid for reflux may be returned to still 21 through line 26. Heavier organic by-products, substantially free of fluorine, are discharged from the bottom of the still through line 27. Small losses in hydrofluoric acid, principally resulting from the carrying-over of acid vapor with the hydrocarbons leaving tank 7 through line 8 and from the small amounts remaining in combination with the organic by-products leaving through line 27 are compensated for by periodic or continuous addition of fresh acid through line 28.

Figure 2:
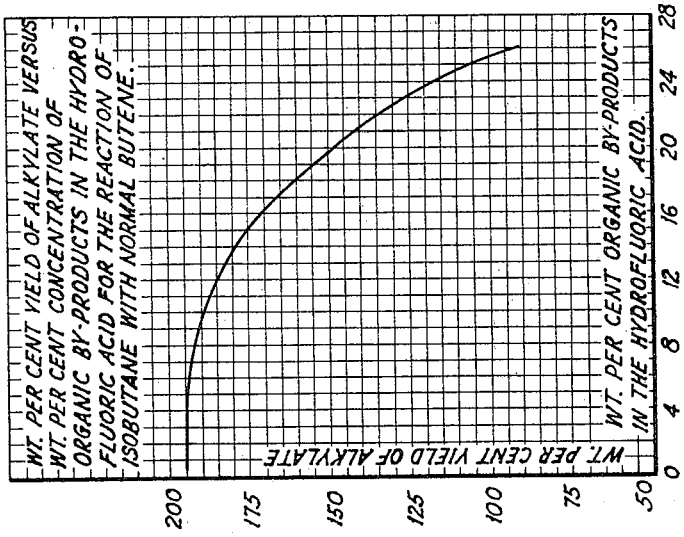

The curve in Figure 2 represents a plot of the weight per cent yield of alkylate product (based upon olefin charged) against the weight per cent concentration of organic by-products in the hydrofluoric acid catalyst for the reaction of isobutane with normal butene.

Figure 3:
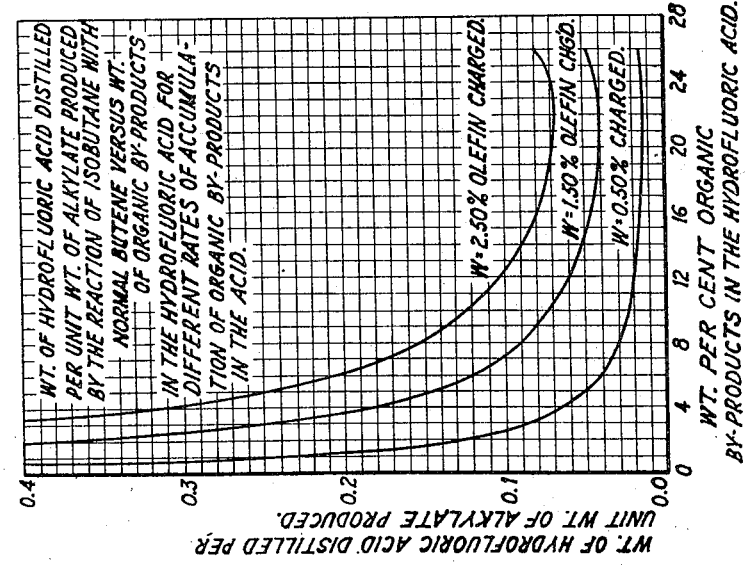

The curves in Figure 3 represent a plot of the weight of hydrofluoric acid distilled per unit weight of alkylate produced by the reaction of isobutane with normal butene against the weight per cent of organic by-products in the hydrofluoric acid for three different rates of formation of organic by-products in the reaction.

The specific examples illustrate the effect of organic by-products in the hydrofluoric acid phase upon the yield of alkylate.

*Example I*

784 parts by weight liquid isobutane are mixed thoroughly with 300 parts by weight of pure hydrofluoric acid. To this well agitated mixture 147 parts by weight of normal butene are added over a period of 210 minutes. During the addition of olefin the temperature is maintained at about —8° C. by circulation of a cold fluid around the reactor. After completing the addition of normal butene, the mixture is stirred for an additional 30 minutes, agitation is then discontinued and the two liquid phases, i. e., the hydrocarbon phase and the hydrofluoric acid phase, are allowed to separate. The hydrofluoric acid phase is then withdrawn as the bottom layer and the hydrocarbon phase is washed with water, dried, and fractionated to recover the material distilling above 27° C. The yield of alkylate distilling above 27° is 286 parts by weight, or 195 per cent based on weight of olefin charged.

*Example II*

The experiment described in Example I is repeated in the presence of 276 parts by weight of spent hydrofluoric acid containing about 8.6 per cent by weight of organic by-products (principally heavy unsaturated hydrocarbons). The yield of alkylate distilling above 27° C. in this case is 282 parts by weight or 192 per cent based on weight of olefin charged.

*Example III*

The experiment described in Example I is repeated in the presence of 339 parts by weight of spent hydrofluoric acid containing about 25.7 per cent by weight of organic by-products (principally heavy unsaturated hydrocarbons). The yield of alkylate distilling above 27° C. in this case is only 139 parts by weight or 95 per cent based on weight of olefin charged.

Similar results are obtained for the yield of alkylate when isobutane is alkylated with other olefins, or when other isoparaffins, or cycloparaffins having a tertiary carbon atom, are alkylated with butene or with other olefins.

From a study of the curve in Figure 2, it may be seen that the yield of alkylate remains substantially constant with concentrations of organic by-products in the acid up to about 8% by weight. Above this figure there is a marked decline in the yield. The curve shows that it is possible to alkylate, while permitting the impurities in the catalyst to remain at equilibrium concentrations as high as about 8% by weight, without appreciably affecting alkylate production.

Once the rate of formation of organic by-products in the acid has been determined for a given alkylation process, it is possible to calculate the amount of hydrofluoric acid which must be distilled to maintain the concentration of organic by-products in the acid catalyst at a constant value. The amount of hydrofluoric acid necessarily distilled varies with the concentration of by-products being maintained in the acid catalyst. This calculation may be made for any alkylation reaction since the weight per cent concentration of by-products equals $$\frac{\text{Weight of organic by-products}}{\text{Weight of organic by-products}+\text{weight of acid}} \times 100$$

or $$\frac{\text{Wt. of by-products formed in unit time}}{\text{Wt. of by-products formed in unit time}+\text{Wt. of acid distilled in unit time}} \times 100$$

and, since the concentration is being maintained constant, the rate of removal of by-products must equal the rate of their formation, the by-product concentration equals $$\frac{\text{Wt. of by-products removed in unit tme}}{\text{Wt. of by-products removed in unit time}+\text{Wt. of acid distilled in unit time}} \times 100$$

For example, in an alkylation plant with a rated capacity of 2730 pounds per hour of alkylate from the reaction of isobutane with normal butene, the rate of accumulation of organic by-products in the acid catalyst was found to be 35 pounds per hour (2.5 per cent based on the olefin charged). In order to maintain the concentration of the by-products in the acid at a value of 1 per cent by weight, the rate of distillation of hydrofluoric acid may be calculated since, $$1 = \frac{35}{35+\text{Wt. of acid distilled per hour}} \times 100$$

or $$\text{Wt. of acid distilled} = \frac{3500-35}{1} = 3465 \text{ pounds/hour}$$

Since 2730 pounds of alkylate are formed per hour, this means that 3465÷2730, or 1.27 pounds of acid must be distilled per pound of alkylate produced.

In contrast thereto, where the concentration of by-products in the acid is maintained at a value of 8% by weight, it is necessary to distill $$8 = \frac{35}{35+\text{Wt. of acid distilled per hour}} \times 100$$

or $$\text{Wt. of acid distilled} = \frac{3500-280}{8} = 403 \text{ pounds/hour}$$

In this case, on the basis of an alkylate production of 2730 pounds per hour, 403÷2730, or 0.148 pound of acid must be distilled per pound of alkylate produced.

The curves in Figure 3 show how markedly the weight of acid distilled per unit weight of alkylate produced varies with the concentration of by-products maintained in the acid. These curves are for three different rates of accumulation (W) of organic by-products in the acid. That is, the left hand curve shows the weight of hydrofluoric acid which must be distilled per unit weight of alkylate produced to maintain the concentration of organic by-products in the acid at the various levels where W, the weight per cent of olefin charged being converted to by-products, is 0.50%. Obviously, as W increases, the amount of acid necessarily distilled to keep the by-product in acid concentration constant at any value increases, as shown by the other two curves. From a study of these curves, the marked influence of the equilibrium concentration of organic by-products in the acid catalyst upon the weight of hydrofluoric acid which must be distilled per unit weight of alkylate produced is readily apparent. In order to maintain the concentration of by-products below 1%, the amount of acid which must be distilled increases enormously. This is true even at low rates of by-product formation, as shown by the left hand curve. Where the amount of by-product formed is higher, say 2.5% based on the weight of olefin charged, the weight of acid distilled necessary to keep the by-product concentration below 1% would be several times the weight of alkylate product produced, resulting in the requirement of large distillation equipment at increased cost, thus increasing the processing cost of the alkylation. In fact, with high rates of by-product formation the equilibrium concentration of by-products would normally be maintained between 4 and about 8%. Where the rate of by-product formation is relatively low, operation by maintaining the equilibrium concentration down to about 1% of by-products is feasible, although here again the concentration would be normally maintained between about 4% and about 8%, since the yield of alkylate would not be noticeably affected and a substantial saving in cost would result.

Looking at the right hand end of the curves in Figure 3, it will be noted that they begin to turn up at the end, indicating that should the amount of by-products rise to too high a value, the weight of hydrofluoric acid which must be distilled per unit weight of product reaches a minimum value and further increases in the equilibrium concentration will have an adverse effect. This is caused by the rapid drop in the yield as the concentration of by-product rises. Inasmuch as the primary concern of the process is efficient alkylation, the accumulation of by-products should never be allowed to rise much above 8% so that this portion of the curves is of no particular concern.

While my invention has been specifically illustrated by the alkylation of isobutane with butene to form isooctane using hydrofluoric acid, the same relative relationships hold true for the alkylation of isopentane with propene, isobutane with propene, ethyl cyclohexane with propene, methyl cyclohexane with propene, isobutane with pentene and the like. With all these catalytic alkylation reactions using hydrofluoric acid as the catalyst, amounts of organic by-products up to about 8% may form without materially affecting the yield of alkylate products. By applying the principles of my invention, it is apparent that the most efficient operation is to allow the equilibrium value for the by-product accumulation to remain at least as high as 1%, and preferably higher, up to values of the order of 8%.

By the use of the term hydrofluoric acid through the description, both anhydrous acid as well as aqueous hydrofluoric acid solutions of sufficient concentrations to be effective as the catalytic agent are included. The process is particularly designed for operation with anhydrous acid. In the case of operation with aqueous acid it may not prove economical to recover the acid from the bottoms of the first still, at least not in a second continuous still. These bottoms will be a mixture of heavy hydrocarbons, organic fluorides, an azeotropic mixture of the acid and water and some excess hydrofluoric acid. Further distillation of hydrogen fluoride from this mixture in the high temperature still would produce a very corrosive aqueous acid. The values in these first still bottoms may, therefore, be recovered by other methods for economical reasons. Additional make-up acid and water may be required to maintain the proper quantity of catalyst at the proper concentration.

In the specific illustration of my invention in Figure 1, I have shown and described an alkylation process in which the distillation of the hydrofluoric acid is continuous and is carried out in two successive stages. As mentioned previously, this distillation may be done in a single still by operating it at the higher temperature. Since relatively small amounts of hydrofluoric acid are distilled in the second still in proportion to the hydrofluoric acid recovered in the first still, the second still may operate as a batch still. The acid recovered from this still would be returned to the cycle in the same manner as the make-up acid. Or in the case of a large plant, the bottoms from a number of low temperature stills may be combined and the acid recovered therefrom in one high temperature still.

In the above description I have illustrated my process as being carried out continuously. That is, the process is one in which the hydrofluoric acid is continuously regenerated in direct relation to the alkylation cycle, by withdrawal from the alkylation zone, separation of the catalyst layer from the hydrocarbons, and the purification of a sufficient portion of the contaminated catalyst to maintain the equilibrium value of the by-product impurities at the desired level, before recycling the withdrawn catalyst. The process is particularly designed for an operation of this type, to enable a correlation of the rate of distillation with the rate of alkylate production, once the rate of by-product formation has been determined.

The principles of my invention are also equally applicable to an operation in which the alkylation process is run continuously, but in which the purification of the catalyst is an intermittent process. In such a process the amount of by-products is allowed to build up to the permissible maximum with simple recirculation of the catalyst. When this value has been reached, the recirculated catalyst is then run through a still, or through the combined high temperature and low temperature stills to separate the hydrofluoric acid from accumulated by-products. Knowing the rate of accumulation of by-products in the system, the total quantity of catalyst in the system, and the rate of recirculation of the catalyst, the time during which the circulated catalyst must be run through the still to reduce the concentration of by-products from the upper limit to some selected lower limit, may readily be determined. The time required for the concentration of by-products to build up to the upper value is determinable from the known rate of by-product accumulation, and the quantity of acid in the system. From this the relative times for on and off operation of the still may be compared. With very low rates of by-product accumulation, or in small alkylation units this method of operation might be preferable.

The principles of my invention are also equally applicable to a full batch operation, in which batch alkylation as well as batch or intermittent distillation are used. Since with a given charge of hydrocarbons only a definite quantity of by-product will be formed, and since operation with by-product concentrations below certain values produces relatively small improvement in the alkylation, it is unnecessary to have the by-product concentration in the catalyst initially below a point where this concentration plus the increase in concentration produced by the by-product formed, does not exceed about 8%. Here the relation of acid distilled to alkylate produced will be one of unit quantities rather than quantities per unit time. By using the principles of my invention, one can readily determine the portion of the weight of hydrofluoric acid used which must be purified before reuse, where weight fraction of olefin charged going to by-products is known.

This application is a continuation-in-part of my copending application Serial Number 320,097, filed February 21, 1940, and now abandoned, wherein the purification of hydrofluoric acid for reuse in an alkylation process by distillation is disclosed.

Many modifications and variations of the invention as herein set forth may be made without departure from the scope thereof, and only such limitations should be imposed as are indicated in the appended claims.

I claim:

1. A process for the alkylation of paraffinic hydrocarbons having a tertiary carbon atom with olefins which comprises contacting the paraffin with the olefin in the presence of an alkylating catalyst consisting essentially of hydrofluoric acid as its active ingredient in an alkylating zone, separating the used catalyst from unreacted hydrocarbons and alkylated product, regenerating the catalyst for reuse by distilling at least a portion of the separated catalyst by heating to a temperature not in excess of 100° C., recovering the hydrogen fluoride vapor evolved from said distillation step, subjecting the unvaporized material from the distillation step to a second, separate distillation step by heating to a temperature in excess of about 150° C. to decompose the major portion of the organic fluorine compounds formed as a result of side reactions in the alkylating zone into hydrogen fluoride and complex organic compounds, recovering the hydrogen fluoride vapor evolved from said second distillation step, and recovering and returning condensed hydrogen fluoride vapor from said distillation step and said second distillation step to the alkylating zone.

2. A process for the alkylation of isobutane with butene which comprises contacting the isobutane with the butene in the presence of an alkylating catalyst consisting essentially of hydrofluoric acid in an alkylating zone to produce isooctane, separating the hydrofluoric acid containing dissolved organic by-products formed in the alkylation reaction from unreacted hydrocarbons and alkylated product, regenerating the catalyst for reuse by dividing it into two portions, subjecting one of said portions to a low temperature distillation between 50° C. and 100° C. and recovering the vaporized hydrofluoric acid overhead, subjecting the non-vaporized residue from the low temperature distillation to a second distillation stage at about 150° C. and recovering the vaporized hydrofluoric acid overhead, adding the distilled hydrofluoric acid to the second portion of the catalyst, correlating the weight of catalyst distilled to the weight of alkylate produced so as to maintain the concentration of organic by-products dissolved in the catalyst in the alkylating zone at between 1% and about 8% by weight, based upon hydrofluoric acid, and returning the two portions to the alkylating zone.

3. A continuous process for the alkylation of isoparaffins with olefins which comprises contacting the isoparaffin with the olefin in the presence of an alkylating catalyst consisting essentially of hydrofluoric acid as its active ingredient in an alkylating zone, continuously withdrawing reaction mixture to a separating zone, separating the reaction mixture into a hydrocarbon layer containing alkylated product and unreacted hydrocarbons and a catalyst layer containing dissolved organic by-products formed in the alkylation reaction, dividing the separated catalyst layer into two portions, regenerating one portion of the separated catalyst to free the hydrofluoric acid from the organic by-products which tend to inhibit its catalytic activity by distillation of the hydrofluoric acid therefrom in two stages, the first being a low temperature distillation between 50° C. and 100° C. and the second a distillation of the non-vaporized residue from the low temperature distillation at about 150° C., correlating the weight of catalyst distilled based upon its hydrofluoric acid content to the weight of alkylate produced so as to maintain the concentration of organic by-products dissolved in the catalyst in the alkylating zone at not less than 1% by weight, and returning substantially all of both portions directly to the alkylating zone.

4. A process for the alkylation of isoparaffins with olefins which comprises contacting the isoparaffin with the olefin in the presence of an alkylating catalyst consisting essentially of hydrofluoric acid in an alkylation zone, separating the used catalyst containing dissolved organic by-products formed in the alkylation reaction from unreacted hydrocarbons and alkylated product, dividing the separated catalyst into two portions, distilling one portion of the separated catalyst to separate the hydrofluoric acid as an overhead from the organic by-products which tend to inhibit its catalytic activity, returning substantially all of the overhead from the distilled portion and of the other portion of the catalyst to the alkylation zone, and adjusting the amount of catalyst in the portion distilled to that in the portion returned without distillation so as to maintain the concentration of organic impurities dissolved in the catalyst in the alkylation zone at between about 4% and about 8% by weight.

CARL S. KUHN, JR.

REFERENCES CITED

The following references are of record in the file of this patent:

UNITED STATES PATENTS

| Number | Name | Date |
|---|---|---|
| 2,224,102 | Holm et al. | Dec. 3, 1940 |
| 2,240,134 | Egloff | Apr. 29, 1941 |
| 2,267,730 | Grosse et al. | Dec. 30, 1941 |
| 2,275,312 | Tinker et al. | Mar. 3, 1942 |
| 2,320,629 | Matuszak | June 1, 1943 |
| 2,335,704 | Smith | Nov. 30, 1943 |
| 2,336,005 | Frey | Dec. 7, 1943 |
| 2,354,641 | Gerhold | July 25, 1944 |

FOREIGN PATENTS

| Number | Country | Date |
|---|---|---|
| 357,438 | Great Britain | Sept. 24, 1931 |

OTHER REFERENCES

"High-Octane . . . Process," preprint of a paper for presentation at 20th annual meeting, A. P. I., Chicago, Nov. 17, 1939, pages 1-11 (pages 2, 3 and 9 pertinent).

Simons article in Industrial and Eng. Chem., vol. 32, Feb. 1940, pages 178-183.